350-3.73 SR
OR 3,530,442
SEARCH ROOM

Sept. 22, 1970 R. J. COLLIER ET AL 3,530,442

HOLOGRAM MEMORY

Filed Oct. 9, 1968 4 Sheets-Sheet 1

INVENTORS R. J. COLLIER
L. H. LIN
BY
Francis E. Morris
ATTORNEY

3530442
OR IN 340/173R

Sept. 22, 1970 R. J. COLLIER ET AL 3,530,442

HOLOGRAM MEMORY

Filed Oct. 9, 1968 4 Sheets-Sheet 4

3,530,442
Patented Sept. 22, 1970

3,530,442

HOLOGRAM MEMORY

Robert J. Collier, New Providence, and Lawrence H. Lin, Chatham, N.J., assignors to Bell Telephone Laboratories, Incorporated, Murray Hill and Berkeley Heights, N.J., a corporation of New York Filed Oct. 9, 1968, Ser. No. 766,240
Int. Cl. G11c *13/04*
U.S. Cl. 340—173 10 Claims

ABSTRACT OF THE DISCLOSURE

A high-speed, high-capacity hologram memory is disclosed. To write into the memory, an $x$–$y$ light deflector is used to address selectively one hologram in a matrix of holograms. Light from this hologram is then directed through a data source and this light is used to write a hologram of the data source into the memory. To read from the memory, the $x$–$y$ deflector addresses the hologram to be read, and its contents are imaged onto a suitable photodetector. For the proper choice and arrangement of materials, mechanical motion is avoided and alignment problems are minimized.

BACKGROUND OF THE INVENTION

This invention is related to optical memories and in particular to high-speed, high-capacity optical memories that record data in hologram form.

When an object is illuminated, it modulates the illuminating beam so as to form a beam of light that carries information representative of the object. If the light is coherent, a record, called a hologram, can be made of the phase and amplitude of this information-bearing beam by interfering on a recording medium, such as a photographic plate, the wavefronts of the information beam and a phase-related reference beam. Proper illumination of the hologram reconstructs therefrom the stored information-bearing beam and therefore an image of the stored object.

In an article entitled "Hologram Memory for Storing Digital Data", at page 1581 of the IBM Technical Disclosure Bulletin, vol. 8, No. 11 (April 1966), V. A. Vitols describes a method for using holograms in a high capacity digital memory. In this technique, the object is a sheet bearing regularly spaced index points or bit positions at which are selectively located indicia representing bits of digital data. Illustratively, the presence of a perforation at an index point signifies a "1" bit while the absence of a perforation signifies a "0" bit. The hologram of this digital data is formed simply by directing coherent light through the perforations in the sheet to a recording medium where it interferes with a suitable reference beam.

Because very little space is required on the recording medium to store a hologram of as many as several thousand bits of digital data, it is possible to store on different areas of the same recording medium different holograms of different sheets of digital data. One exposes one area of the recording medium to one data sheet, then substitutes another data sheet for the first, lines up an unexposed portion of the recording medium with the new data sheet and exposes that previously unexposed portion to the new sheet. The result of such a procedure is to form on the recording medium an array of holograms, each of which is a recording of a sheet of digital data.

The information recorded in the holograms can be read by directing an appropriate light beam at one hologram at a time. Such a procedure produces in an image plane a pattern of light spots representative of the pattern of perforations on the original data sheets and this pattern of light spots can be detected in the image plane and interpreted by appropriate equipment. As disclosed by F. M. Smits and L. E. Gallaher in "Design Considerations for a Semipermanent Optical Memory," Bell System Technical Journal, page 1267 (July–August 1967), such detection and interpretation equipment might be an array of photodetectors and associated circuitry.

Such a system as that described above is extremely attractive. A hologram inherently has optical properties similar to those of a lens. Hence separate lenses are theoretically not required to image the contents of the hologram memory onto the array of photodetectors. Second, because the resolution obtainable in a unity-magnification imaging situation is close to the maximum theoretical limits, each light spot that is imaged onto a photodetector is as small and as intense as possible. Lastly, because the information stored in the hologram is stored uniformly throughout the hologram rather than at discrete areas, the hologram is relatively insensitive to blemishes or dust on the recording medium. A small blemish or dust particle on the hologram memory cannot obscure a bit of digital data, as it could if the bits were stored in the memory as little spots of light.

At the same time, the capacity and speed of the hologram memory system is quite attractive. In their article, Smits and Gallaher demonstrate that the capacity of the memory is in excess of one hundred million bits if the data is stored in the form of approximately ten thousand holograms each containing approximately ten thousand bits of data. Moreover, the access time to any one hologram can be less than ten microseconds (10 $\mu$sec.).

While extremely attractive, realization of the full potential of the high-speed, high-capacity hologram memory system has proven to be a very tantalizing goal for the worker in the art. There are numerous problems. First, each hologram must be recorded in such a fashion that when it is read its information is imaged onto the proper elements in the photodetector array. While his alignment problem is relatively easy for the case where there is only one hologram, it has been quite complex for large arrays of holograms that must be read accurately at high speeds. Second, during the recording of a hologram on a particular portion of the recodring medium, the remainder of the recording medium should not be affected. In previous proposals, this has been accomplished by masking all of the recording medium except that where the recording is being made. To record on other portions of the recording medium, the mask or the recording medium is moved as required. While straightforward, such a procedure is not attractive for the high speeds and accuracies required of the hologram memory system because the mechanical equipment necessary to move the mask or the recording medium quickly and accurately is extremely complex and a prime source of failure in the system. Third, when the hologram memory is read it must be correctly aligned with the photodetector array. In the past this has been a serious problem because after the hologram was recorded the recording medium has had to be developed at a location other than its position during the recording process. Moreover, the orientation of the hologram usually has had to be changed. Typically, the recording medium is demounted and then developed and fixed in appropriate solutions. Once it has dried, it is then remounted and realigned with the apparatus so that when it is read the information it contains is imaged onto the proper elements in the photodetector array. Needless to say, the realignment task is tedious and time consuming; and as a result it has not been practical to record or to change the contents of the hologram memory rapidly.

SUMMARY OF THE INVENTION

Accordingly, it is an object of our invention to improve optical memory systems; and more particularly it is an object of our invention to improve high-speed, high-capacity optical memory systems that record data in hologram form.

It is a further object of our invention to simplify the task of aligning the information stored in the hologram memory with the elements of the detection equipment.

It is another object of our invention to organize the hologram memory and its peripheral equipment so that the memory can be written and read without altering the position of the hologram memory.

It is still a further object of our invention to reduce mechanical motion in the writing and reading elements of the memory system.

These and other objects of our invention are achieved by a combination of various devices that we have found to be suitable for recording and interrogating a hologram memory. Basically our apparatus comprises a coherent light source, typically a laser, an $x$–$y$ deflector, several reflectors and beam splitters, a data source comprising a sheet containing a matrix of perforations over which is imposed an electronic shutter matrix, a recording medium on which the hologram memory is formed, a second electronic shutter matrix superimposed on the recording medium, a matrix of phase holograms, a field lens that images light from the phase holograms through the data source to the recording medium in a fashion that is detailed below, and a matrix of photodetectors. As is standard practice in holography, phase-relation between the reference beam and the information-bearing beam from the object, which in this case is the data source, is achieved by deriving from the same light source both the reference beam and the light that is incident on the data source.

In forming a hologram of data supplied by the data source, the cooperation of several devices is required to produce coincidence of the reference beam and the information-bearing beam on the particular portion of the recording medium on which the hologram is to be located. First, the location of the portion to be illuminated is determined by the $x$–$y$ deflector which is capable of deflecting the light from the laser to one of as many discrete areas as there are to be separate holograms on the recording medium. Once deflected, the beam is divided to form a reference beam and an illuminating beam. The illuminating beam is next incident on one of the holograms in the array of phase holograms. This array contains as many phase holograms as there are discrete holograms to be formed on the recording medium, there being a one-to-one relation between the phase holograms and the holograms formed on the recording medium. Thus light from the one phase hologram that is illuminated is imaged by the field lens through the data source onto that particular portion of the recording medium on which the hologram is to be formed. Simultaneously, the reference beam is also directed onto this portion and a hologram is therefore formed by the interference of the two light beams.

Additional holograms are stored elsewhere on the recording medium by repeating these steps for light beams incident on other portions of the recording medium.

The data source comprises an otherwise opaque sheet containing a matrix of regularly spaced perforations through which light can pass and, superimposed on this sheet, an electronic shutter. This shutter, which illustratively is comprised of a matrix of Pockels cells of such dimensions that one Pockels cell is lined up with one perforation, can be biased electronically to permit the passage of light through only selected cells to the recording medium. Thus the particular pattern of light spots incident on the recording medium can be altered simply by varying the voltages applied to the Pockels cells.

A similar electronic shutter is positioned in front of the recording medium to permit light to reach only that portion of the medium on which the hologram is being written. In this case, of course, there are as many Pockels cells as there are holograms to be stored and the dimensions of each Pockels cell are determined by the dimensions of the individual holograms to be stored.

The recording medium is a self-developing, erasable medium such as the thermoplastic material described by Urbach and Meier in "Thermoplastic Xerographic Holography," Applied Optics, 5, page 666 (April 1966). Because of its properties, the recording medium never need be moved from its position in the apparatus. Consequently, once the recording medium is properly aligned, it need never be disturbed.

To read the memory, a read beam is directed through the memory in a direction anti-parallel to the direction of the reference beam. In other words, the read beam is the conjugate of the reference beam and travels in a direction opposite to that of the reference beam. As is well known in holography, such a beam projects from the hologram a beam of light that travels in a direction opposite to that of the information beam and forms a real image of the object at the same distance from the hologram as the object was when the hologram was formed. Consequently, the read beam forms a real image of the pattern of light spots that is recorded on the hologram. To detect this image, a beam splitter is put in the path of the light from the hologram to deflect the light so that the image plane is located near the plane of a matrix of photodetectors. This matrix, in turn, is wired to appropriate means for utilizing the information incident on it.

The relative simplicity of this system arises from the combination and the arrangement of several of its elements. The use of the $x$–$y$ deflector, the array of phase holograms, and a field lens to direct information from a single data source to a multitude of locations on the recording medium makes it possible to align, detect and interpret the hologram memory easily with only one array of photodetectors, for when the real image of the light pattern stored in any hologram is reconstructed by the read beam it is always reconstructed in the same location no matter where the hologram was located in the hologram memory. Likewise, the use of a self-developing, erasable recording medium greatly reduces the alignment problems encountered with other hologram memories because the self-developing, erasable memory can be developed in place and changed in place if the need arises. Furthermore, as will be illustrated in conjunction with the detailed description below, in our system it is possible to form a read beam that is anti-parallel to the reference beam without reversing the position of the hologram memory and, consequently, without requiring realignment of the memory. As a result, the only alignment required of this system is the initial alignment that aligns one hologram of the memory with the array of photodetectors; and once aligned, the memory can be written and read interchangeably without moving the hologram memory. Still another advantage of this system arises from the absence of mechanical devices in the system. Consequently, it is faster, more precise and more reliable. Moreover, there is no mechanical motion to disturb and misalign the elements of the system.

BRIEF DESCRIPTION OF THE DRAWING

These and other elements, features and objects of our invention will be more readily understood from the following detailed description of our invention taken in conjunction with the following drawing in which.

DETAILED DESCRIPTION OF THE DRAWING

A preliminary definition

From the very beginning, holography was not limited to the recording of the phase and amplitude of a modulated beam from an object illuminated with visible light. The first work in holography was an effort to record objects "illuminated" by X-rays; and recordings have been made of objects illuminated by microwaves, infra-red frequencies, visible light and ultraviolet frequencies. Techniques have also been developed to make holograms of objects "illuminated" by acoustic waves. While all such waves might be described generically as radiation, we have chosen as a matter of convenience, and to some extent as a matter of custom in this art, to describe the hologram formation process in terms of the exposure of a recording medium by light. It is to be understood that our use of the word "light" and similar words is intended to embrace the use of any form of "illumination" or radiation, visible or invisible, in a hologram forming technique and is not limited to the use of visible light. Similarly, other means than visible light can be used to "illuminate" the hologram if suitable detectors are employed.

Figure 1:
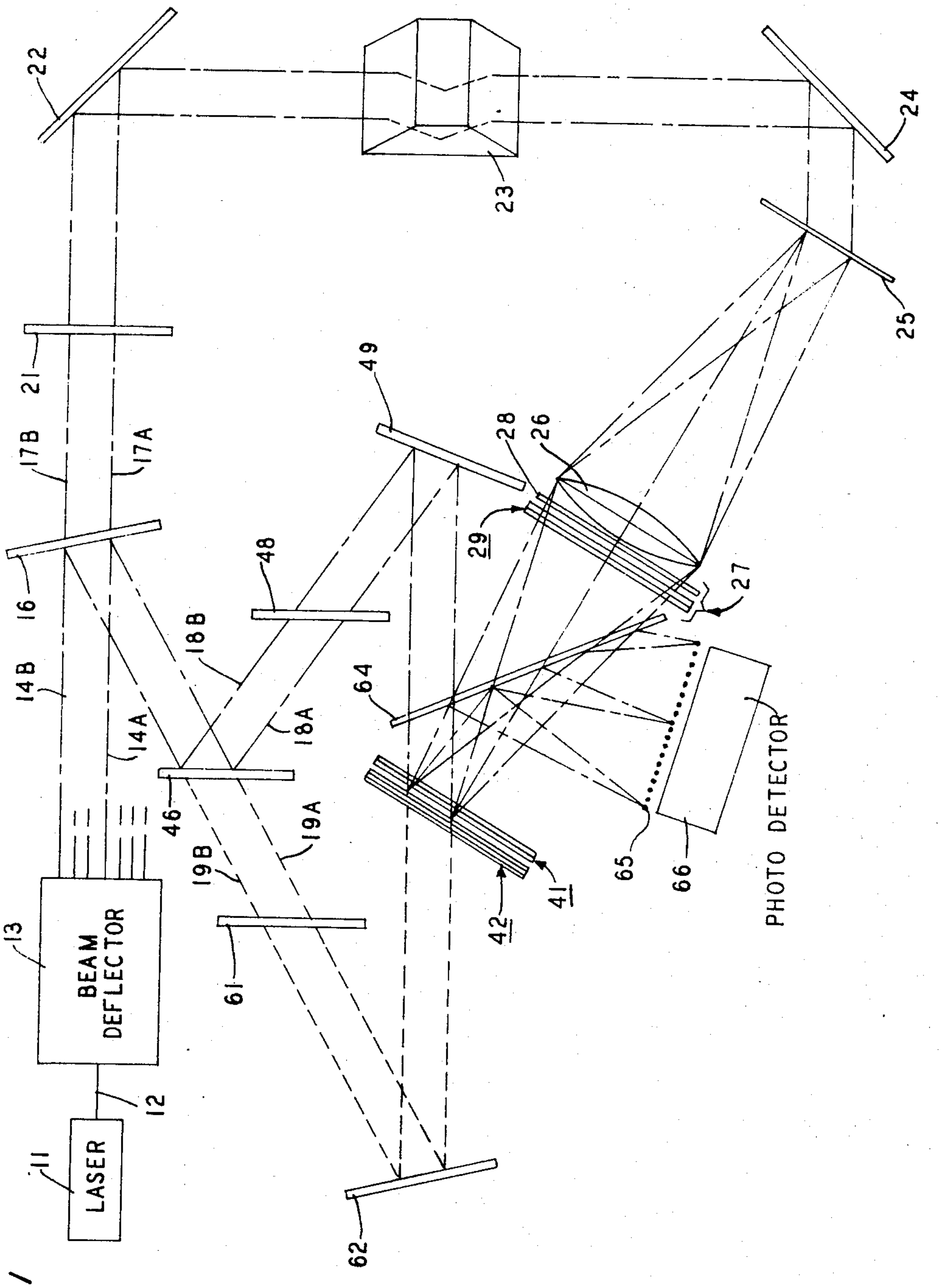
FIG. 1 shows a schematic illustration of illustrative apparatus used to practice our invention.

Turning now to FIG. 1, there is shown an illustrative embodiment of our invention. This system comprises a laser 11, a light beam deflector 13 capable of deflecting an incident beam to anyone of several paths, two beam splitters 16 and 46 that divide an incident beam into three beams, and three branches of equipment that process the three beams formed by these beam splitters. In the first branch, which is also called the illumination branch, is a shutter 21, a reflector 22, a Dove prism 23, a second reflector 24, a matrix 25 of high-efficiency phase holograms, a field lens 26, a data source 27 comprising a mask 28 and an electronic shutter 29, a second electronic shutter 41 and a self-developing, erasable recording medium 42. In the second branch, which is also called the reference branch, is a second shutter 48, a reflector 49 and the electronic shutter 41 and recording medium 42. In the third branch, which is also called the read branch, is a third shutter 61, a reflector 62, the recording medium 42 and second electronic shutter 41, and a matrix 66 of photodetectors.

Laser 11 preferably is a high power laser such as the YAG:Nd laser, frequency doubled to produce a watt of green light. Many other lasers are also available. Beam deflector 13 is typically a pair of cascaded acousto-optic light deflectors oriented to produce deflection in two orthogonal directions and appropriate lens elements arranged to render parallel the different beam paths down which the light may be deflected. By applying appropriate voltages to each of the deflectors, an incident beam can be deflected down anyone of a set of parallel paths. For convenience of illustration and discussion, the directions of these paths will be assumed to be in planes parallel to the page on which FIG. 1 is drawn and in planes perpendicular to the page.

Beam splitters 16 and 46, shutters 21, 48, and 61, reflectors 22, 24, 49 and 62, Dove prism 23, and field lens 26 are standard optical equipment, preferably of high efficiency. For reasons that will become apparent below, the purpose of Dove prism 23 is to invert the different planes of beam paths parallel to the plane of the page. This inversion takes place about the plane that is incident on the center of the sloping side of prism 23. For convenience, the center plane is assumed to be the plane of the drawing.

Figure 2:
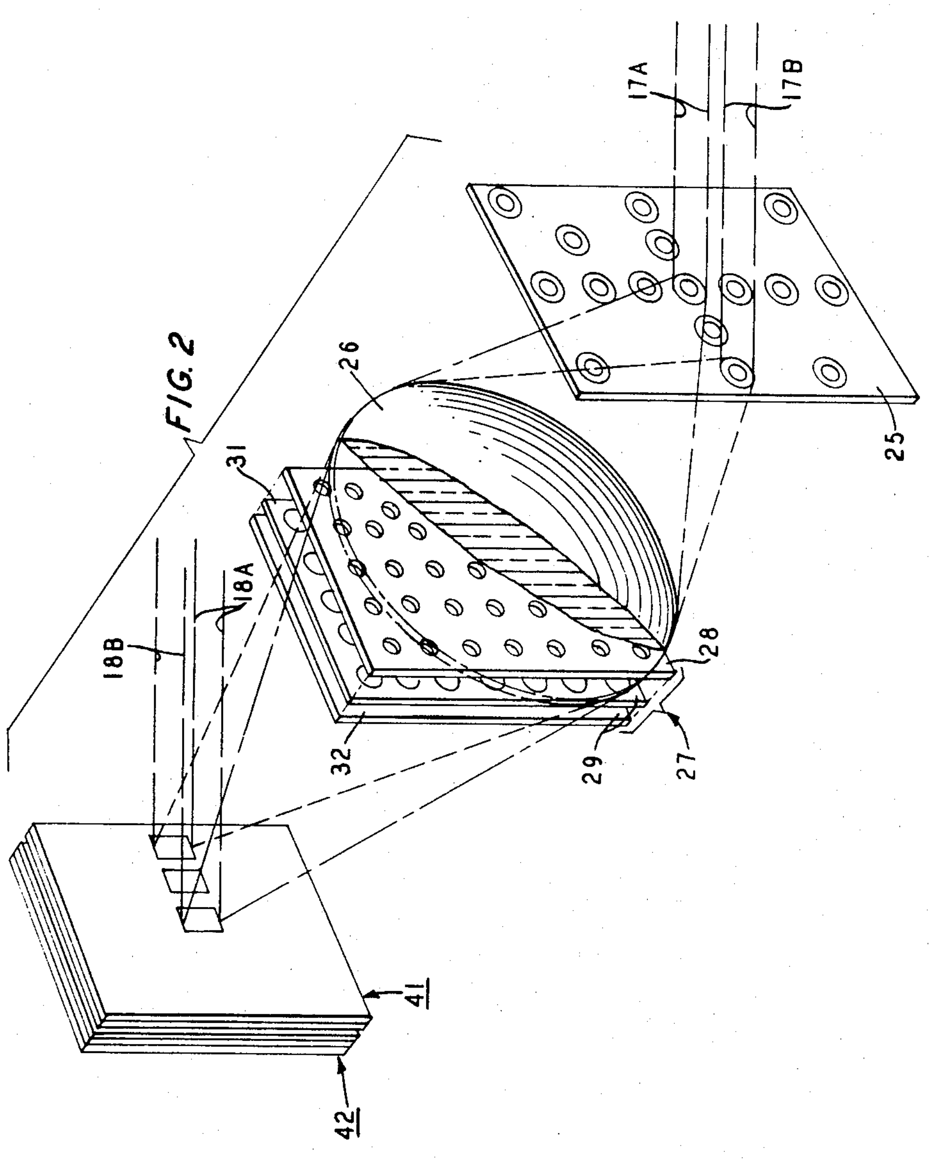
FIG. 2 shows a perspective view of certain elements of FIG. 1.

As is shown more clearly in the exploded perspective view of FIG. 2, matrix 25 of phase holograms is an array of holograms, so formed that each hologram is in line with one of the paths down which deflector 13 can deflect a beam of light. The formation of these holograms is detailed below in conjunction with FIG. 3. Because of the way these holograms are formed, when any of them is illuminated as shown in FIG. 1, it diffracts most of the incident light in a diverging beam toward field lens 26 located approximately two focal lengths away. Field lens 26, in turn, images the diverging light from the hologram through data source 27 onto a portion of electronic shutter 41 located directly in front of recording medium 42, medium 42 being approximately two focal lengths from lens 26.

The mask 28 in data source 27 is typically a rectangular array of holes or transparent regions in an otherwise opaque medium. Closely superimposed on this matrix is an electronic shutter 29, which is illustratively a matrix 31 of electrically switched Pockels cells, each cell of which is individually biased and centered over a perforation, and a polarizing sheet 32. Because the light incident on data source 27 is plane-polarized, the pattern of light spots transmitted through data source 27 to a portion of recording medium 42 can therefore be varied simply by varying the voltages applied to the different Pockels cells. Second electronic shutter 41, which shields recording medium 42, may be an array 39 of electrically switched Pockels cells and a polarizing sheet 40 oriented to act as an analyzer. As in the case of shutter 29, the individual cells of array 39 may be separately biased to permit or to prevent exposure of those parts of recording medium 42 behind them. Further details about the operation of shutters 29 and 41 will be given in conjunction with the description of FIG. 4.

To record a hologram on recording medium 42 of FIG. 1, shutters 21 and 48 are set to allow transmission of light and shutter 61 is set to block any transmission of light. The portion of medium 42 to be exposed is selected by applying appropriate voltages to shutter 41 to render transparent only that part of the shutter shielding the portion of medium 42 that is to be exposed. The pattern of light spots to be recorded thereon is similarly selected by applying suitable voltages to shutter 29 in data source 27 to make transparent the desired parts of shutter 29. And the proper voltages are applied to the acousto-optic deflectors of deflector 13 to deflect incident light in such a way as to illuminate the transparent portion of shutter 41 and thus expose the desired portion of recording medium 42.

A beam of coherent light 12 is then directed from light source 11 to deflector 13 where it is deflected down the particular path previously selected from the many paths available. For illustrative purposes, two such paths, 14A and 14B, are shown situated in the plane of FIG. 1. The deflected beam is next incident on beam splitter 16 which sends half the beam down the illuminating branch toward shutter 21 and the other half toward beam splitter 46 which sends half the beam down the reference branch toward shutter 48 and the other half down the read branch toward shutter 61 where it is stopped. For convenience, the remaining light paths shown will be referred to as illuminating paths 17A and 17B and reference paths 18A and 18B and light beams propagating down these paths will be referred to as illuminating beams and reference beams, as appropriate.

The illuminating beam traverses shutter 21, is reflected by reflector 22, inverted by prism 23, reflected by reflector 24 and is incident on one of the holograms in the matrix 25 of phase holograms. Note that reflectors 22 and 24 invert the position of the beam paths 17A and 17B, which lie in the plane of the page on which FIG. 1 is drawn, but do not invert the position of the planes parallel to the page. Note also that Dove prism 23 inverts the position of the planes parallel to the page about their centermost plane but does not invert the position of beam paths that lie in the same plane.

As has been noted above, a light beam incident on any one of the holograms in matrix 25, diffracts a diverging beam toward field lens 26 which redirects the beam to data source 27. Only the light incident on the holes or transparent regions in mask 28 of data source 27 transmits the mask. And of that portion only the light incident on the properly biased Pockels cells of shutter 29 traverses shutter 41 and is incident on recording medium 42. This light may be termed the information-bearing beam.

Preferably, there is a one-to-one alignment of the Pockells cells of shutter 41 with the holograms of matrix 25 and with the light beam paths that are accessed by beam deflector 13. Consequently, when light is diffracted by any one of the holograms of matrix 25, it is converged by lens 26 onto one of the Pockels cells of shutter 41; and when light is diffracted by any other hologram, it is converged onto a different Pockels cell. Similarly, light deflected by deflector 13 to form a reference beam is aligned on a cell not so illuminated from any other path. Moreover, the system is so designed that the information-bearing beam and the reference beam are aligned on the same Pockels cell. And the Pockels cells in shutter 41 are loacted sufficiently close to recording medium 42 and are sufficiently thin and sufficiently wide that when a Pockels cell is properly biased to permit transmission through the shutter of the two light beams incident on it the two beams interfere on recording medium 42 to form a hologram.

The one-to-one alignment of Pockels cells of shutter 41 with the holograms of matrix 25 is shown in FIG. 2. Briefly, lens 26 images light diffracted by one hologram from an illuminating beam on path 17A to one Pockels cell in shutter 41 and light diffracted by a different hologram from a beam on path 17B to a different Pockels cell. The alignment of information-bearing beams derived from light propagating down paths 17A and 17B with reference beams on reference paths 18A and 18B is also shown in FIG. 2. Paths 17A and 17B and all other paths lying in any plane parallel to the plane of the drawing are inverted within their plane about the center beam path by reflectors 22 and 24. And the planes parallel to the drawing are inverted with respect to their centermost plane by Dove prism 23. Consequently, the illuminating beams incident on matrix 25 are incident on paths that have been inverted up-to-down and right-to-left. The light from the hologram, however, is inverted by lens 26; and consequently is properly aligned with the reference beams propagating down the never-inverted reference beam paths 18A and 18B.

Additional holograms may be recorded on different parts of medium 42 by applying different voltages to shutter 41 to render transparent other portions of the shutter. Simultaneously, the pattern of light spots that is holographically recorded is varied by varying the voltages applied to shutter 29 in data source 27. And the correct voltages are applied to the acousto-optic deflectors of deflector 13 to deflect light to the transparent portion of shutter 41.

As before, a light beam 12 is then directed from laser 11 to deflector 13 where it is deflected down the path selected for it. As suggested above, this path is different from any other path used to record a hologram on recording medium 42. Consequently, when part of the deflected light beam is incident on hologram matrix 25, it is incident on a different hologram than that on which is incident a light beam traversing any other path. And the light diffracted from the hologram illuminated in matrix 25 forms a hologram on a different portion of medium 42.

As has been described in the discussion of the background of this invention, storage of an array of as many as ten thousand holograms on a recording medium is feasible. To store each of these holograms, beam deflector 13 must form ten thousand different light beam paths, and there must be ten thousand holograms in matrix 25 and ten thousand Pockels cells in shutter 41. Because each hologram can store approximately ten thousand bits of data in the form of the presence or absence of a spot of light, mask 28 also has ten thousand holes or transparent regions and shutter 29 contains ten thousand Pockels cells.

To read any one of the ten thousand holograms formed on recording medium 42 as detailed above, shutters 21 and 48 of FIG. 1 are first set to block any transmission of light and shutter 61 is set to allow the transmission of light. The proper voltages are applied to the acousto-optic deflectors of deflector 13 to deflect incident light in such a way as to illuminate at least the portion of recording medium 42 on which is stored the hologram to be read. Simultaneously, appropriate voltages are applied to shutter 41 to render transparent only that part of the shutter shielding the portion of medium 42 that is to be read.

A beam of coherent light 12 is then directed from light source 11 to deflector 13 where it is deflected down the particular path selected by applying the proper voltages to deflector 13. The deflected beam is split by beam splitters 16 and 46, stopped by shutters 21 and 48, and permitted to transit shutter 61. For convenience, the paths of two such beams, which are referred to as read paths 19A and 19B, are shown in FIG. 1; and light beams propagating down these paths will be referred to as read beams. Read beams are deflected to paths 19A and 19B by applying to deflector 13 the same voltages that are applied to produce illuminating beams on paths 17A and 17B, respectively.

Once past shutter 61, a read beam is reflected by reflector 62 and is incident on the desired one of the holograms on recording medium 42. As has already been indicated, this beam is anti-parallel to the reference beam used in forming the hologram it illuminates. This light is then diffracted by the hologram through the transparent Pockels cell of shutter 41 located in front of recording medium 42 and is incident on beam splitter 64. Approximately half of this light is reflected by beam splitter 64 in the direction of matrix 66 photodetectors and forms a real image 65 immediately in front of matrix 66. This image is an image of the pattern of light spots that was formed by shutter 29 of data source when the hologram was made; and it is located the same distance from recording medium 42 as shutter 29 was when the hologram was made.

Matrix 66 is illustratively comprised of an array of light sensitive photodiodes such as that described in the aforementioned article by Smits and Gallaher. The array is quite close to the plane of image 65 and contains as many photodiodes as there can be spots of light in the image, one photodiode being lined up opposite each position where a spot of light can be formed. The presence or absence of a light spot opposite the photodiode can thus be transferred into an electric signal; and this signal can be stored, for example, in a flip-flop in a buffer memory.

Figure 3:
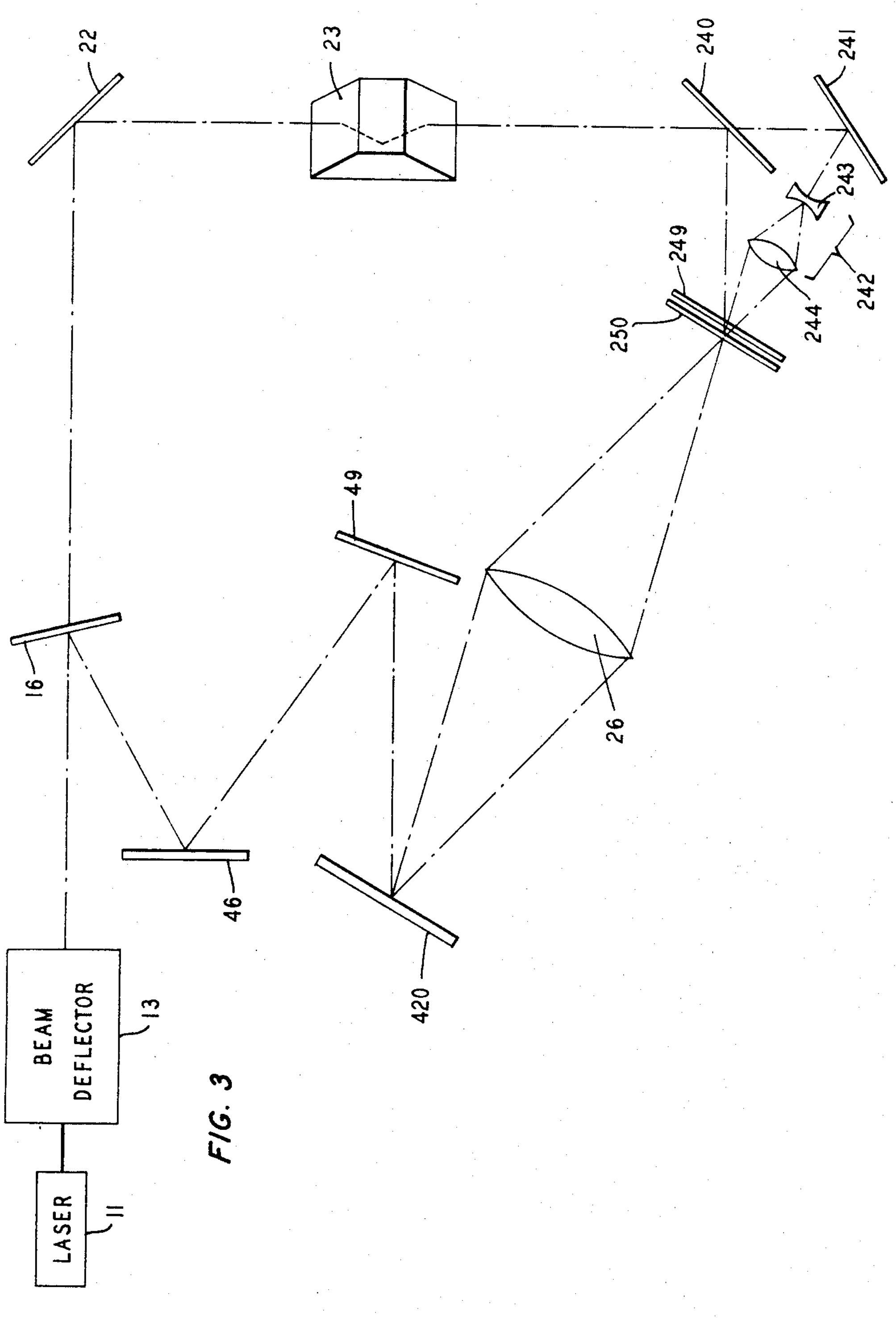
FIG. 3 shows a schematic illustration of illustrative apparatus used to form another element of FIG. 1.

The matrix of phase holograms 25 that is used in illuminating recording medium 42 can be formed by a modification of the apparatus of FIG. 1 that is shown in FIG. 3. The elements therein are laser 11, beam deflector 13, beam splitters 16 and 46, reflectors 22 and 49, Dove prism 23, beam splitter 240, a mask 249, a recording medium 250, lens 26, a target 420, a reflector 241, and a lens system 242 comprised of a diverging lens 243 and a converging lens 244. Note the absence of such elements as data source 27 and recording medium 42 of FIG. 1. Note also the use of beam splitter 240 to derive a fourth beam of light from laser 11 and the substitution of recording medium 250 and target 420 precisely in the place of hologram matrix 25 and recording medium 42, respectively.

Recording medium 250 is any material capable of storing hologram information as a variation in either the thickness or the index of refraction of the material, or both. Such variations alter the path length of light that illuminates the material, thereby altering the phase of such light; and these phase changes are sufficient to reproduce the information stored in the hologram. The particular advantage of phase holograms is their high efficiency as compared with standard, absorption-type holograms formed in silver halide emulsions, for phase holograms are able to diffract considerably more of the light incident on them. See, for example, H. W. Kogelnik, "Hologram Efficiency and Response," Microwaves, vol. 6, p. 68 (November 1967).

An especially efficient material for recording phase holograms is the dichromated gelatin described by T. A. Shankoff in his co-pending patent application, Ser. No. 676,866, of Oct. 20, 1967 and by L. H. Lin in his copending application, Ser. No. 717,207, of Mar. 29, 1968, both applications being assigned to Bell Telephone Laboratories, Incorporated.

Before forming a hologram on recording medium 250 it is necessary to line up the light from lens system 242 with both light reflected by beam splitter 240 and reference beam light that has reached target 420. This is done simply by removing recording medium 250 from its position indicated in FIG. 3 and replacing it with a translucent screen (not shown) that has enough reflectivity to allow one to observe the light beams incident on it. Light is then directed from laser 11 through beam deflector 13 to beam splitter 16. Part of this light is deflected from there down the reference branch to target 420. The undeflected portion is incident on beam splitter 240. Part of this light is reflected to a spot on the translucent screen located where medium 250 would otherwise be; and the remainder transits beam splitter 240 and is reflected by reflector 241 to lens system 242. This system forms a beam that diverges from a spot located approximately on the translucent screen. The diverging beam is then imaged by lens 26 onto target 420. By suitable adjustment of lens system 242, the light beam from the lens system can be made to diverge from the spot on the translucent screen on which is incident the beam deflected from beam splitter 240 and to converge on the spot on target 420 on which is incident the reference beam.

To form a hologram of this diverging beam, the translucent screen is taken away, recording medium 250 is replaced in the position from which it was removed and mask 249 is placed over it. Mask 249 is comprised of one small transparent region in an otherwise opaque medium and this transparent region is aligned with the spot from which the beam from lens system 242 diverges. A light beam from laser 11 is then directed through the system to beam splitter 240 where it is split into two beams. One of these beams is reflected directly through the transparent region of mask 249 onto recording medium 250. The other transists beam splitter 240, is reflected by reflector 241 ot lens system 242 and is there formed into a beam that converges through the transparent region of mask 249 to a spot near recording medium 250 from which it diverges toward target 420.

The interference of these two beams on recording medium 250 forms an interference pattern that when recorded constitutes a hologram. The nature of a hologram is such that when one of the beams used in forming the hologram is later incident on the hologram the incident beam is diffracted to reconstruct the other beam used in forming the hologram. Hence, once recording medium 250 is developed to form a hologram, a beam incident on it in the same direction as that of the light beam reflected from beam splitter 240 will be diffracted to form the same diverging beam that is directed by lens 26 onto the spot on target 420 on which is also incident the reference beam. Thus if the hologram is part of matrix 25 of FIG. 1 and if recording medium 42 is in the same place as target 420 once was, the hologram when illuminated diffracts a diverging beam that is directed by lens 26 onto the same spot on which the reference beam is incident.

Obviously a matrix of such holograms can be formed simply by repeating the above steps for beams of light deflected by beam deflector 13 to different parts of recording medium 250.

Figure 4:
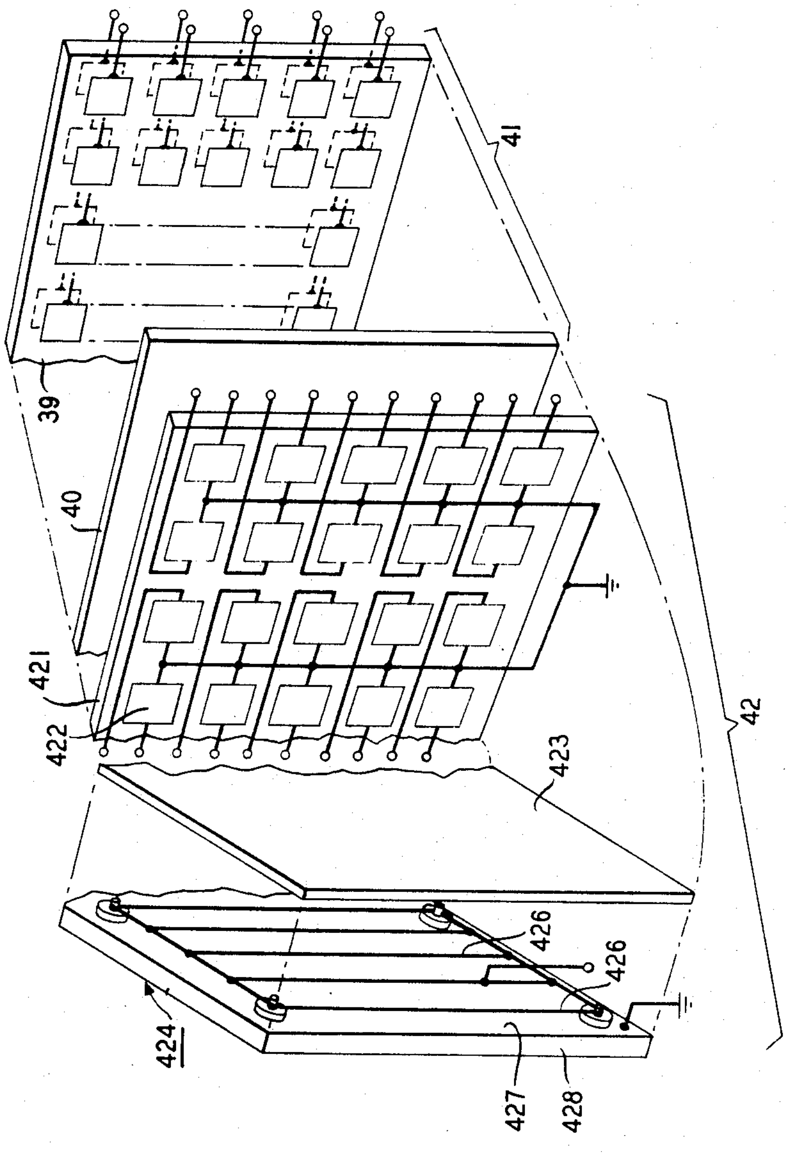
FIG. 4 shows a perspective view of certain other elements of FIG. 1.

Turning now to FIG. 4, there is shown an exploded view of the structure of shutter 41 and recording medium 42 as used in our invention. As indicated previously in FIGS. 1 and 2, shutter 41 is comprised of a matrix 39 of Pockels cells, each cell being aligned with one of the illumination holograms of matrix 25, and sheet 40 of polarizing material, illustratively oriented to allow transmission of incident light polarized in the horizontal direction. As is well known in the art, an appropriate voltage applied to a particular Pockels cell in matrix 39 can rotate the polarization of plane-polarized light passing through the cell. Not shown in FIG. 4 but shown in FIGS. 1 and 2 to the right of shutter 41 is a similar electronic shutter 29 that is comprised of a similar matrix 31 of Pockels cells and a sheet 32 of polarizing material illustratively oriented to allow transmission of incident light polarized in the vertical direction.

Because the light from deflector 13 is planepolarized, illustratively in the vertical direction, the operation of shutters 29 and 41 is as follows. Those cells in matrix 31 of shutter 29 that are not biased do not affect the polarization of the light incident on them; and when the light from the unbiased cells is incident on vertically polarized sheet 32, it passes through. However, any cell that is biased does affect the polarization of light traversing it; and for the correct bias it is possible to rotate the polarization of an incident beam by 90° so that the light emerging from the biased cells of matrix 31 is horizontally polarized. This light is stopped by sheet 32.

Accordingly, there is incident on matrix 39 of shutter 41 a vertically polarized reference beam and the vertically polarized light that has traversed sheet 32. Those cells in matrix 39 that are not biased do not affect the polarization of the incident light; and when this light is next incident on horizontally polarized sheet 40, it is stopped. However, any cell that is biased does affect the polarization of light traversing it; and for the correct bias it is possible to rotate the polarization so that the light becomes horizontally polarized and is therefore able to traverse sheet 40 and interfere on recording medium 42.

As has been explained above, we expose only one small portion of the recording medium at a time. Hence it is only necessary to bias one of the Pockels cells of matrix 39 for each exposure.

Recording medium 42 comprises a glass plate 421 on discrete areas of which are deposited transparent electrodes 422 made of such materials as tin-oxide. Each tin-oxide electrode is connected to ground at one of its edges and to a current supply at the opposite edge. The particular areas on which the transparent electrodes are formed are aligned with the Pockels cells of matrix 39 and therefore with the location of the holograms recorded in recording medium 42. On top of the tin-oxide-coated glass plate 421 is coated a layer 423 of thermoplastic material such as that described in the aforementioned article of Urbach and Meier. The thermoplastic material may simply be flowed over the tin-oxide-coated glass plate or, if desired, it can be separated into discrete areas corresponding to the tin-oxide areas. A photoconductive material is either mixed into this thermoplastic material or is coated over it. The holograms recorded in medium 42 are actually recorded in thermoplastic layer 423.

In the hologram recording process, thermoplastic layer 423 is first charged by a corona charging device 424 and a portion of the layer is then exposed to the information-bearing and reference beams and finally subjected to heat. Corona charging device 424 is any device capable of producing a high voltage between a thin wire electrode 426 and a ground electrode 427 to ionize the surrounding air and charge up adjacent insulators, such as thermoplastic layer 423. Ground electrode 427 is a transparent electrode illustratively made by depositing a layer of tin-oxide on a glass plate 428. Electrode 426 is typically a grid of fine wires so arranged that the wires do not interfere with any read beams which are incident from the left on recording medium 42. Electrode 426 is mounted on glass plate 428 and is insulated from electrode 427 by appropriate means.

Corona charging device 424 places a uniform charge on the adjacent major surface of thermoplastic layer 423, thereby sensitizing the layer. A portion of the thermoplastic layer is then exposed through electronic shutter 41 to an information-bearing beam and a reference beam. This light causes the charge to selectively leak off to ground through the photoconductive material illustratively located in thermoplastic layer 423 and through the tin-oxide electrodes 422 located on the other major surface of layer 423. Because the amount of charge that leaks off through the thermoplastic layer is directly proportional to the intensity of the light incident on the layer, the charge that remains on the surface of the thermoplastic is essentially a negative replication of the light pattern.

This pattern is then fixed by heating up the exposed portion of the thermoplastic by running a current pulse through the tin-oxide electrode 422 located in front of the exposed portion. The plastic deforms in those areas where its surface is charged because of the forces set up by the electric field thereon; and when the heated portion of thermoplastic layer 423 cools, the deformation that remains is a record, or a hologram, of the interference between the information-bearing beam and the reference beam.

Obviously, this process can be used to record other holograms in other portions of thermoplastic layer 423. Beam deflector 13 of FIG. 1 and electronic shutter 41 are simply set to expose a different portion of layer 423; and an appropriate voltage is applied to the tin-oxide electrode 422 in front of the exposed portion of layer 423 to fix it.

Any hologram recorded in a portion of thermoplastic layer 423 can also be erased from the hologram memory by applying to the tin-oxide electrode 422 in front of it a sufficiently large current pulse. This current pulse, which is appreciably larger than that used in recording the hologram in the portion of thermoplastic layer 423 adjacent electrode 422, heats up the adjacent thermoplastic enough that the surface tension of the thermoplastic removes the deformation in the surface of the plastic. This portion of layer 423 is then available for use in recording another hologram.

As will be obvious to those skilled in the art, many modifications can be made in the system we have described. Any source of coherent radiation can be used provided the recording medium is sensitive to the wavelength of the radiation and the elements of the system operate as described above at the wavelength of the radiation. Other means than acousto-optic deflectors can be used in beam deflector 13 to deflect light down one of an array of beam paths. For example, there are both digital and analog light deflectors that use electro-optic phenomena to produce a light beam deflection. And arrays other than $x$–$y$ arrays may prove more practical in certain situations.

The light beam deflection and inversion methods may, of course, be varied to suit the convenience of the user. Dove prism 23, for example, could be located between beam splitters 16 and 46 of FIG. 1 instead of between reflectors 22 and 24 where it is shown. Or an Amici, or roof, prism could be used in place of reflector 22 or reflector 24 and the Dove prism be eliminated altogether. Countless other arrangements can be devised by anyone having ordinary skill in geometrical optics.

The matrix 25 of phase holograms can, of course, be formed in any medium suitable for recording phase holograms. Conceivably, the holograms could be ordinary absorption-type holograms if the large loss of light could be tolerated.

Shutter matrices 29 and 41 can be comprised of many materials other than the polarizing sheets and matrices of Pockels cells we have described. Obviously, matrices of Kerr cells could be used simply by substituting them for the matrices of Pockels cells. Far more radical changes could be made with materials presently being developed. For example, in "Dynamic Scattering: A New Electro-optic Effect in Certain Classes of Nematic Liquid Crystals," Proceedings of the IEEE, 56, page 1162 (July 1968), G. H. Heilmeier, L. A. Zanoni, and L. A. Barton describe at page 1171 how a voltage applied to a liquid crystal can affect the amount of light transmitted through the cell. An array of such liquid crystal cells could be used in place of the polarizing sheets and Pockels cells in shutters 29 and 41. Similarly, herapathite suspensions of ferroelectric ceramics can also be used in place of the materials we have described. Indeed, mechanical shutters could be used, but only at the price we described in the introduction to this invention.

For the particular recording medium shown in FIG. 4, it may be possible to do without shutter 41. The hologram cannot be recorded in a portion of thermoplastic layer 423 unless that portion is heated the proper amount. Moreover, the application of a current pulse to a particular one of electrodes 422 heats only the adjacent thermoplastic. Hence, even if light is incident on other portions of thermoplastic layer 423, a record is made only near electrode 422 and the other parts of the layer are substantially unaffected. Nevertheless, because the use of shutter 41 with recording medium 42 seems to give a more precise definition of the region where the hologram is formed, we prefer to use both elements.

We have also considered using other materials for storage of the holograms. Thus photochromics and ferroelectrics seem practical and could be used with our apparatus. At present, however, thermoplastic materials appear to be most feasible.

It will be appreciated that those skilled in the art may devise still other arrangements that fall within the spirit and scope of the invention.

What is claimed is:

1. A hologram memory comprising:
a source of coherent radiation from which is derived a beam of coherent radiation;
optical means for deflecting the beam to one of several positions and for forming the beam into an illuminating beam, a reference beam, and a read beam;
a first array of holograms, on one of which holograms is incident the illuminating beam, the particular hologram depending on the deflection of the beam by the optical means;
a data source on which is incident light from the illuminated hologram of the first array, the output of which source may be varied electronically;
a recording medium, on part of which the reference beam and light from the data source interfere, the particular part of which depending on the particular hologram illuminated in the first array of holograms;
said recording medium being capable of recording on more than one of its parts a record of the interference between a suitably deflected reference beam and light from the data source;
each such record constituting a hologram and all such halograms constituting a second array of holograms;
said second array of holograms being positioned where holograms in the second array can be illuminated by the read beam; and
means for detecting a real image of the data source projected from any hologram in the second array of holograms when the hologram is illuminated by the read beam.

2. The hologram memory of claim 1 wherein the recording medium is self-developing and the read beam that illuminates the holograms in the second array of holograms is anti-parallel to the reference beam.

3. The hologram memory of claim 2 wherein the recording medium is comprised of:
a thin sheet of thermoplastic material having two major surfaces;
a transparent electrode located on one major surface of the sheet of theromplastic material; and a transparent corona charging device located on the other major surface of the sheet of theromplastic material.

4. The hologram memory of either claim 1 or claim 3 wherein the data source is comprised of:

an array of electro-optic devices that can alter the polarization of light passing through them; and a sheet of polarizing material.

5. The hologram memory of claim 4 wherein the electro-optic devices are either Pockels cells or Kerr cells.

6. The hologram memory of claim 4 wherein the image detecting means is comprised of an array of photodetectors, each photodetector being aligned with a spot in the real image of the data source that corresponds to the location of one of the electro-optic devices of the data source.

7. The hologram memory of either claim 1 or claim 3 wherein the part of the recording medium on which the reference beam and the light from the data source interfere is varied by an array of electro-optic devices that can alter the polarization of light passing through them; and a sheet of polarizing material crossed with respect to the poralization of the light incident on the electro-optic devices.

8. A method for forming a hologram memory comprising the steps of:

successively directing a beam of light to different holograms in an array of holograms to form different second beams of light;

successively directing the different second beams of light through an electronically variable data source to form different information-bearing beams;

successively interfering on different portions of a recording medium the different information-bearing beams and a reference beam to form thereon different interference patterns, the particular portion of the recording medium depending on the particular hologram illuminated in the array of holograms; and making a record, which constitutes the hologram memory, of the different interference patterns.

9. A method for reading a hologram memory whose formation comprised the steps of:

successively directing a beam of light to different holograms in an array of holograms to form different second beams of light;

successively directing the different second beams of light through an electronically variable data source to form different information-bearing beams;

successively interfering on different portions of a recording medium the different information-bearing beams and a reference beam to form thereon different interference patterns, the particular portion of the recording medium depending on the particular hologram illuminated in the array of holograms; and making a record, which constitutes the hologram memory, of the different interference patterns;

comprising the step of directing a read beam to the record of one of the different interference patterns written in the hologram memory to reconstruct a conjugate of the information-bearing beam that formed that record, said conjugate beam forming a real image of the data source in front of an array of photodetectors.

10. The method of claim 9 wherein the electronically variable data source is comprised of:

an array of electro-optice devices that can alter the polarization of light passing through them; and each photodetector is aligned with a spot in the real image of the data source that corresponds to the location of one of the electro-optic devices of the data source.

References Cited

UNITED STATES PATENTS 2,982,176 5/1961 Kay ---------------- 350—3.5

OTHER REFERENCES

Vitols, Hologram Memory for Storing Digital Data, IBM Technical Disclosure Bulletin, vol. 8, No. 11, April 1966, pp. 1581–1583.

BERNARD KONICK, Primary Examiner

H. L. BERNSTEIN, Assistant Examiner

U.S. Cl. X.R.

250—219; 350—3.5